UNITED STATES PATENT OFFICE.

WILLIAM F. MILLER AND CHARLES W. STOVER, OF TIPTON, IOWA.

HOG-CHOLERA COMPOUND.

SPECIFICATION forming part of Letters Patent No. 244,643, dated July 19, 1881.

Application filed January 11, 1881. (Specimens.)

*To all whom it may concern:*

Be it known that we, WILLIAM FOSTER MILLER and CHARLES WILLIAM STOVER, of Tipton, in the county of Cedar and State of Iowa, have invented a new Hog-Cholera Compound, of which the following is a specification.

Our invention consists of a liquid composition to be mixed with the following powder in doses as used or in quantities together.

The powder composition consists of the following ingredients, in about the proportions stated, viz: sulphur, two pounds; copperas, three-fourths of a pound; saltpeter, three-fourths of a pound; black antimony, one pound; resin, one-fourth of a pound.

The liquid composition consists of the following ingredients, in about the proportions stated, viz: turpentine, one pint; spirits camphor, one pint; cayenne pepper, one-half of an ounce; carbolic acid, one-half of an ounce.

The ingredients of the powder are to be ground together and thoroughly mixed, and the ingredients forming the liquid are to be put directly into quart-bottles, and it should be thoroughly shaken before being used.

In using the above compounds in severe cases of hog-cholera one table-spoonful of the powder and one table-spoonful of the liquid should be put in two quarts of milk and given to the hog. In cases which are not so severe, where drenching is not necessary, three-fifths of a table-spoonful in the same quantity of milk would be a sufficient dose to produce the desired effect.

By the use of these compounds in the manner stated hogs may be cured of the hog-cholera, coughs, thumps, and many other diseases to which they are subject.

It is obvious that instead of combining the liquid and powder at the time of using, as described, the ingredients of both may be mixed together in the first instance and put in a single package, in which case a sufficient quantity of water may be added to make the compound, after being thoroughly shaken, flow readily from the package, and in such case the dose should be enlarged according to the amount of water used. If a quart of water should be used to the proportions of the ingredients named, the dose should be three table-spoonfuls in severe cases.

We are aware that it is not new to make the powder of the ingredients described; but

What we claim as new is—

A liquid composition consisting of turpentine one pint, spirits of camphor one pint, cayenne pepper one-half of an ounce, and carbolic acid one-half of an ounce, as described.

WILLIAM FOSTER MILLER.
CHAS. WILLIAM STOVER.

Witnesses:
CHAS. C. LAUDT,
J. T. O'HARA.